INVENTORS
CARL H. INGWER
CLYDE E. WRIGHT
HERMAN WEIBEL

BY *J. W. Douglass*

THEIR ATTORNEY

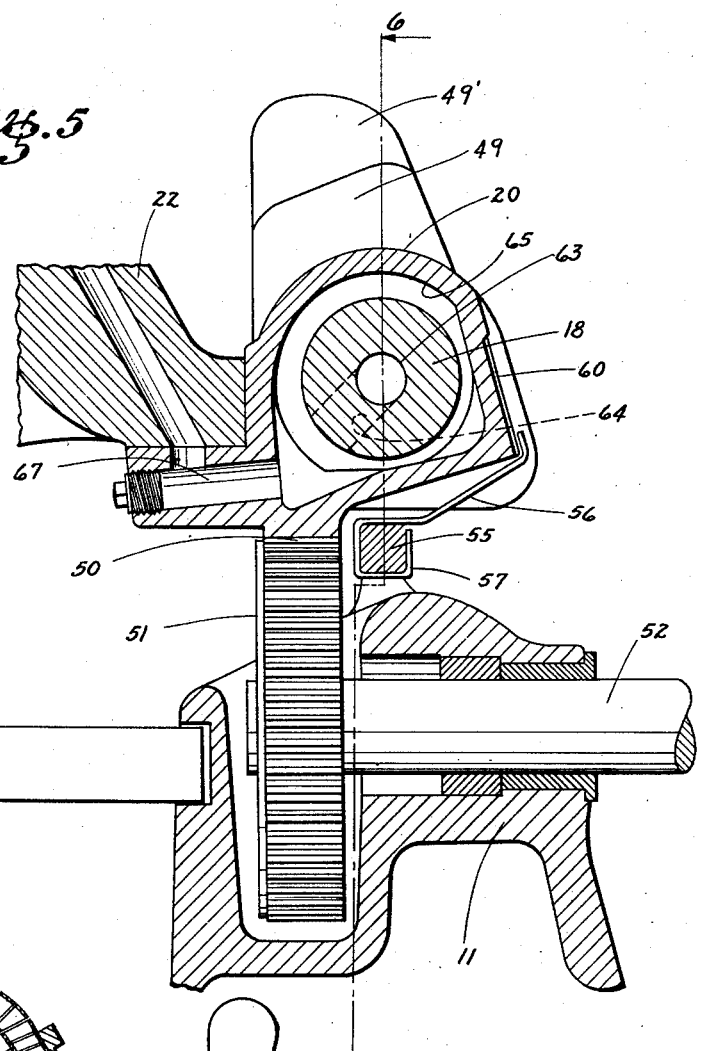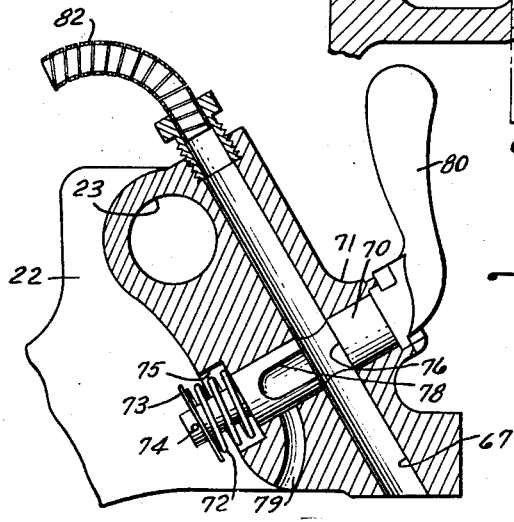

INVENTORS
CARL H. INGWER
CLYDE E. WRIGHT
HERMAN WEIBEL
BY
THEIR ATTORNEY

Dec. 15, 1959    C. H. INGWER ET AL    2,916,749
POWER THREADING TOOL HAVING LUBRICATION MEANS FOR
THE TOOL CARRIAGE AND THE DIE HEAD CUTTERS
Filed Oct. 22, 1956                    5 Sheets-Sheet 5

Inventor
CARL H. INGWER
CLYDE E WRIGHT
HERMAN WEIBEL
By J. V. Douglas
   Their Attorney United States Patent Office 2,916,749
Patented Dec. 15, 1959

2,916,749

POWER THREADING TOOL HAVING LUBRICATION MEANS FOR THE TOOL CARRIAGE AND THE DIE HEAD CUTTERS

Carl H. Ingwer and Clyde E. Wright, Elyria, and Herman Weibel, Lakewood, Ohio, assignors to The Ridge Tool Company, Elyria, Ohio Application October 22, 1956, Serial No. 617,376

1 Claim. (Cl. 10—106)

This invention relates to pipe working tools, and more particularly to a pipe working tool having a power driven chuck and a cutting oil pumping system and a carriage having various tools mounted thereon.

This application is a continuation-in-part of our copending application Serial No. 568,915, filed March 1, 1956, which is a division of our application Serial No. 215,412, filed March 14, 1951.

The rapid increase in the use of power driven pipe working tools has been accompanied by many improvements in that class of tools. However, many problems remained unsolved. The present invention, by the construction used, eliminates several of the previous difficulties.

Prior devices for the powered driving of pipe for threading and cutting have usually consisted of a power driven chuck having a stop means in the form of a hook or fork to prevent a customary type hand operated pipe tool from rotating as the pipe was turned relative to the tool.

More recently the complete power driven tool has appeared in which the pipe is driven by a chuck similar to the one formerly used separately. The pipe cutters, threaders, reamers, etc., are then mounted on a sliding carriage which in turn is mounted on ways so that it can be moved toward or away from the chuck. These devices have had poorly arranged carriages. We have discovered a considerably more efficient arrangement. In addition, by means of a novel free floating mounting of the pipe cutter, the machine of our invention is enabled to cut pipe which is out-of-round or slightly bent. This has not been possible heretofore because of the rigid mounting of the cutter. Moreover, the prior machines have had clumsy, inconvenient means, or no means at all, for handling the supply of cutting oil to the work piece being operated on. By the construction of the new machine of our invention, the oil is transmitted through the supporting ways of the carriage to the carriage and through passageways in the carriage to a nozzle which applies the oil directly to the workpiece.

A more complete understanding of the invention may be had by referring to the following specification and figures in which:

Fig. 4 is a detailed partial sectional view through the valve of the oil system drawn to an enlarged scale;

Fig. 5 is a detailed partial sectional view from line 5—5 of Fig. 2 drawn to an enlarged scale;

Briefly, the invention consists of a power drive machine primarily designed for cutting, threading and otherwise working pipe, although it may also be used to cut and thread bolts or the like. The machine consists of a framework including legs and a bed which supports a power driven chuck. Extending from the housing of the chuck are a pair of supporting ways. A carriage carrying the tools is slidably journalled on these ways. The tools on the carriage are arranged with the thread cutting dies on the side nearest the chuck, the reamer in the center and the pipe cutter tool at the other end. The pipe cutter is mounted so as to be fully floating so that it will adjust itself to any out-of-round or bent formation of the pipe or other workpiece to be cut.

The cutting oil for this machine is brought from an oil pump through passages in the ways to an outlet. The carriage is formed to catch the oil from the outlet and conduct it through passages in the carriage and a valve therein to a flexible tube which is always carried with the carriage and is therefore much more convenient than prior devices where the oil spout was fixed to the frame.

Figure 7:
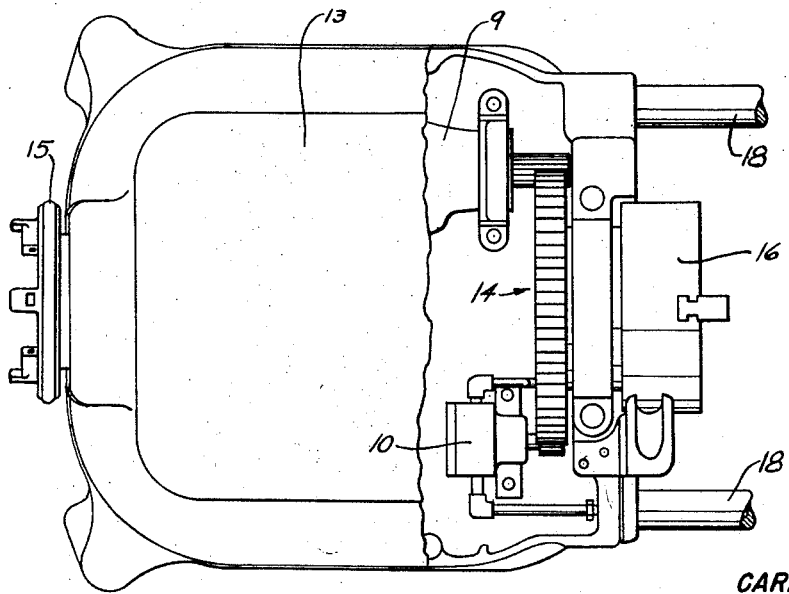
Fig. 7 is a partial top plan view with a part broken away.
Figure 8:
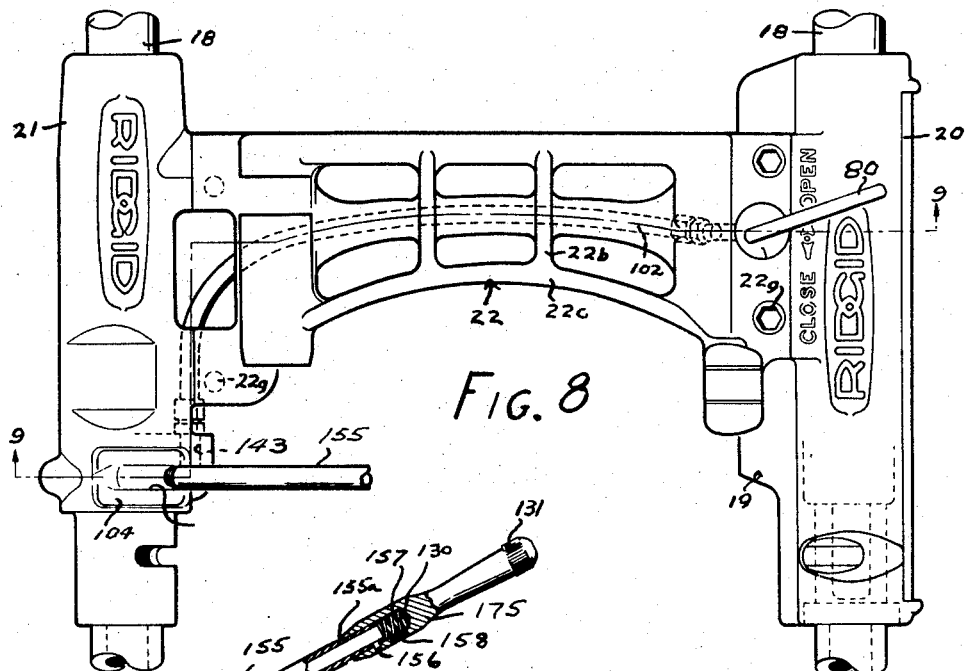
Fig. 8 is a plan view of a carriage certain parts being shown in fragment.

More specifically, and with reference to the drawings, the invention consists of a machine having a bed or base 11 supported by legs 12. A power drive is mounted on one end of the base 11 and comprises a housing 13 enclosing a motor 9 and oil pump 10, Fig. 7. The motor drives both the chuck 16 and the pump through an arrangement of gears 14 within the housing. A work holder or guide 15 connected to the end of a hollow shaft opposite to the chuck 16 extends from the other end of the housing.

Extending from the housing toward the end of the base 11 opposite the housing are a pair of bars 18 which serve as supports or ways for the carriage 19. The carriage is composed of two members 20 and 21 extending longitudinally of the bars 18 and joined by a transverse member 22. The transverse member is formed with a pair of holes 23 to receive posts on a pipe threading device (not shown) and to hold the threader loosely in place. A sliding pin having a knurled head 25 is provided to hold the threader in place in a manner well known in the art. The holes 23 extend from the surface nearest the chuck 16.

Spaced somewhat further from the chuck 16 is a pipe reamer 27. This reamer is journalled on a pin 28 extending through an ear 29 on the transverse member 22. A handle 30 on the reamer extends beyond the cutter portion 31 and provides means to lift the reamer out of the way and lay it over the back of the carriage. In its lowered position, an arm 32 of the reamer rests on a boss 33 on the transverse member and is supported against motion longitudinally of the ways by an ear 34. The third tool required in a normal pipe threading operation is a cutter. In the current machine, the cutter 35 is journalled on a turned down boss 36 on the rear longitudinal member 21. The mounting for this tool is novel in that it allows free movement of the device in two directions. A journal or mounting member 37 is journalled on the boss 36 and holds a pin or set screw 38 extending into a slot in the boss cut only partially around the boss. This slot retains the member 37 longitudinally of the boss 36 and restricts its rotating motion.

Figure 3:
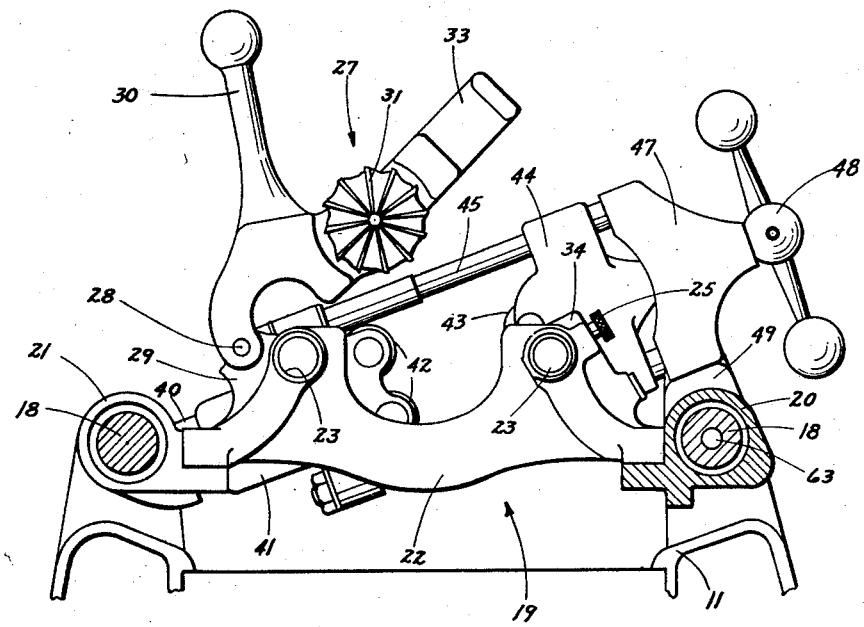
Fig. 3 is an end elevational view from one end of the carriage.

The member 37 is formed with a rectangular arm 40 extending transversely of the bar 18 in an upward direction from a location somewhat beneath the bar (Fig. 3). A roller support member 41 is formed with a rectangular opening which is a smooth sliding fit with the arm 40. Thus the roller member 41 is free to slide on the arm 40 or to pivot about the boss 36 thus having complete freedom of motion in one plane. The customary type of pipe cutting mechanism is built up on the roller member 41. A pair of rollers 42 are journalled on the member 41, and a cutter wheel 43 is journalled in a housing 44 which is slidably mounted on rods 45 extending from the member 41. A screw 46 journalled rotatably in end member 47 fixed to the ends of the rods 45, forces the cutter housing 44 towards the rollers 42 and cuts the pipe in a manner well known in the art. A handle 48 is fixed on the screw 46 to provide the operator a ready means for turning the screw. The cutter also may rest on a boss 49 against an ear 49' on the front sliding member 20.

It is apparent that the cutter is free to follow any movement which the end of the pipe may take in a plane perpendicular to the axis of the pipe. Thus, any out-of-round condition or slightly bent ends can be accommodated without fear of damage to the cutter device. It is also apparent that the pipe reamer 27 could be similarly mounted for the same reason although this usually is not necessary.

Figure 6:
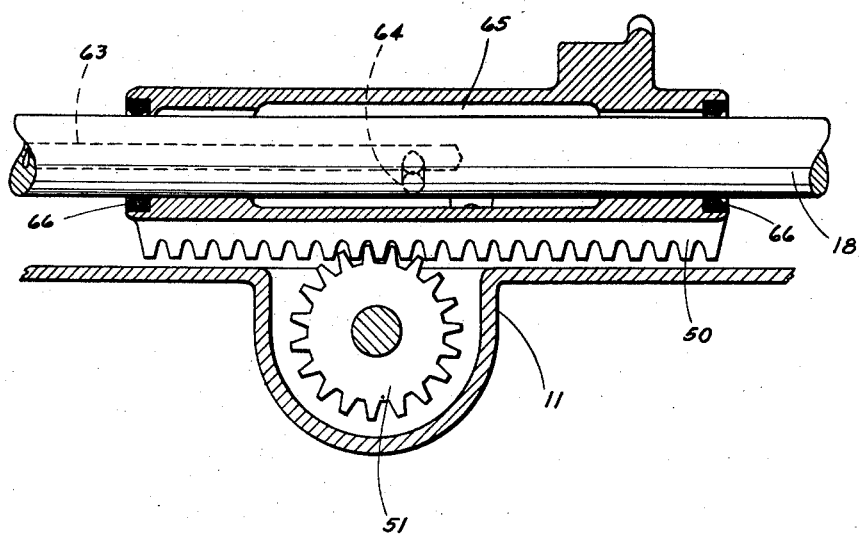
Fig. 6 is a sectional view along line 6—6 of Fig. 6.

The means for moving the carriage of this embodiment of my invention takes the form of a rack and pinion arrangement (Figs. 5 and 6). The rack 50 is formed on the front longitudinal member 20 with its teeth extending downwardly. The pinion 51 is mounted on a shaft 52 journalled in the base 11. A hand wheel 53 on the shaft provides the means to turn the pinion.

On the front of the base 11 directly beneath the front bar 18 is mounted a square or other flat sided member 55. An indexing tab 56 is slidably disposed on this member. The tab 56 has a collar 57 wrapped around the member 55 so as to engage the flat sides to prevent turning, and is pressed tightly enough to be smoothly manually adjustable and to hold its adjustment resiliently. The tab extends outwardly and upwardly from the collar 57 and terminates adjacent the front longitudinal carriage member 20 where it may be grasped conveniently by the operator of the machine.

A scale 60 is marked or fixed on the front of the member 20 in the region adjacent the extension of the tab 56. This scale may be graduated in any convenient units, but the left hand end is preferably marked with the gage lengths of threads for the various sizes of pipes. If the rest of the divisions are inches and fractions thereof, the one inch line may also be conveniently inserted since it falls between the gage lengths for 1- and 1¼ inch pipe, and that for 1½ and 2-inch pipe. A pair of bosses 61 extending downwardly is formed on the carriage member 20 just beyond the scale 60 in position to engage the tab 56 to assure that the tab is always in convenient position.

It is apparent that the above described scale will be useful in threading pipe. The tab 56 can be slid along the member 55 until it touches the left hand boss 61 at the position where the threading dies begin to take their first cut. At this point, the index line on the tab is directly aligned with the zero line on the scale. As the carriage is then moved to the left in the threading operation, the operator can watch the scale and determine directly therefrom when to stop the machine or to release the cutting dies from the pipe. The scale may also be useful in cutting nipples of a certain length or in cutting from a piece of pipe, an end of a certain length to retain the desired length of pipe in the chuck 16.

In order to provide cutting oil to the work piece being operated on, an oil system is provided. The oil pump 10 pumps oil into a passage 63 (Figs. 6 and 7) formed in the front supporting bar 18. The passage extends into the bar to a point just at the center of travel of the carriage where it is intersected by a hole 64 leading to the surface of the bar 18. The front carriage member 20 is journalled on the bar 18 only at its ends, being formed with an enlarged chamber 65 between the ends. Movement of the carriage is limited so that the hole 64 always opens into this chamber 65. Thus the oil from the pump runs through the passage 63 and the hole 64 into the chamber 65. Oil seals 66 may be provided at the journalled ends of the carriage member 20.

Within the carriage, an oil passage 67 is formed extending from the chamber 65 transversely and then upward into the transverse member 22. A valve 68 (Fig. 4) preferably adapted to bypass the flow of the fluid is mounted in the transverse member 22 to control the flow of oil onto the work. The bypass type of valve is preferred since this prevents the building up of a pressure within the chamber 65 and consequent leakage of oil out of the ends.

One simple preferred type of bypass valve is shown in Fig. 4. A valve barrel 70 is journalled in a boss 71 formed in the transverse member 22, and in line with the passage 67. The barrel is held in place by a compression spring 72 engaged between a washer 73 held on the barrel by a pin 74 and a counterbored surface 75 on the member 22. A transverse slot 76 adapted to be aligned with the passage 67 is formed in the barrel to allow straight through flow. Bypass flow is provided by a longitudinal slot 78 adapted to connect the lower part of the passage 67 with a bypas outlet 79. A handle 80 is provided on the barrel to turn it.

From the valve 68 the oil normally flows upward into a flexible adjustable tube 82 terminating in a nozzle 83. This tube is just long enough to allow the nozzle to be positioned at one of the pipe working tools on this carriage. Since it is mounted on the carriage, the tube need not be long but is conveniently short and requires a minimum amount of adjusting in contrast to prior devices where the oil lines were fixed to the frame.

The oil return to the pump 16 is through a screen 84 to a sump formed in the base 11 which catches the oil and from which the pump draws the oil to pump it again through the system.

Figure 1:
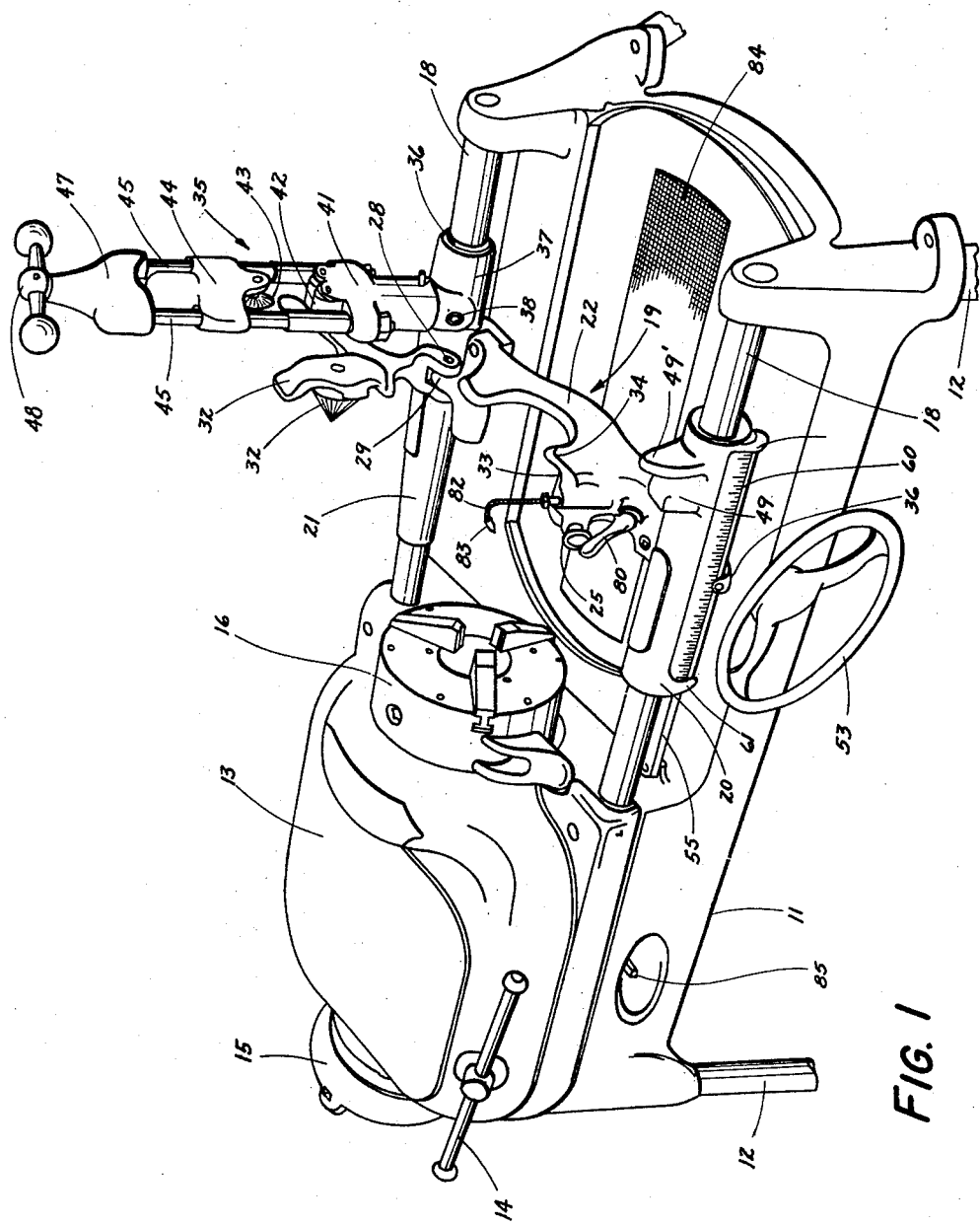
Fig. 1 is a perspective view of a pipe working machine embodying the invention.
Figure 2:
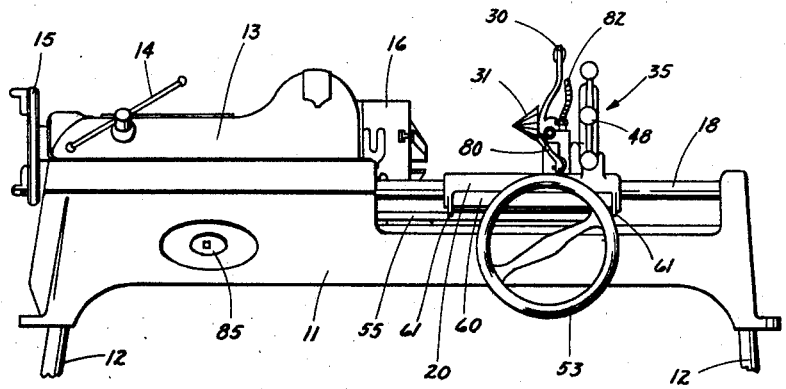
Fig. 2 is a detailed side elevational view of the machine.

In use, a pipe is inserted in the chuck 16 extending far enough to pass through the threader in which the chasers are withdrawn, past the reamer 27 which is raised out of the way, and into the cutter 35 when the carriage is moved to its position furtherest to the left (Fig. 1). The chuck is tightened and the motor started for rotation in either direction for cutting the pipe by a switch at 85. The cutter wheel 43 is pressed into the pipe in a manner well known in the art and the pipe is cut. Because of the free mounting of the cutter, no special care need be taken to be sure that the pipe is straight or round or properly centered.

The carriage is then moved slightly to the right so that the cut end of the pipe is directly in the line of the reamer 27. The pipe is then rotated so that the upper surface is moving away from the operator. This is the direction which would unscrew a normal pipe from the chasers if they were engaged. With the pipe rotating in this direction, the reamer 27 is pressed down on the upper edge of the pipe. The reamer blades will then cut a slight chamfer on the end, making an easy start into the chasers possible.

After this operation, the motor is reversed by the reversing switch 85, the carriage moved to the right, the chasers closed and the indexing tab 56 set. Before each cutting operation, the nozzle 83 of the oil system may be adjusted slightly to each of the separate tools. However, since it is carried by the carriage, the adjustment is slight and none of the tools is drenched with oil by the change of position of the carriage. Because of the reversal of the motor in these operations, and the consequent reversal of direction of rotation of the oil pump, it is necessary to have some sort of reversible pump such as that disclosed in the co-pending application of Anton J. Janik, Serial No. 161,660 filed May 12, 1950, now U.S. Patent No. 2,716,947 issued September 6, 1955.

The threads are cut in a manner well known in the art, the machine running until the proper gage line on the scale is reached. An additional signal to the operator is provided for by the open construction of the carriage. It is, therefore, possible to see the chasers easily, and if the chasers are constructed so that the full gage length of threads is cut as the end of the pipe reaches the end of the chasers, it is readily visible as a signal to the operator that the pipe is properly threaded. At the time when this point is reached, the chasers are released, thus stopping the thread cutting operation.

The pipe is then reamed by inserting the reamer into the opening and moving the carriage so that the reamer operates to cut the burrs off the inside of the pipe. The threading operation is complete at this point, but if the piece is to be a nipple, the carriage could be moved one more step and the pipe cut off.

Thus, it is apparent that a single cycle of motion from right to left and back again completes all the operations customarily performed on this type of machine. In addition, the various sub-combinations are more efficient in their individual operations than previous devices.

In Figs. 8 to 11 inclusive there has been illustrated a modification of the carriage 19 to provide another improved type of oil supply means. The principal difference between this and the previously described embodiment being that the oil supply outlet is rigid and extends forwardly from the rear of the carriage as viewed by the operator.

The structure has an advantage in that it is out of the way of the operator and its adjustment is more easily made.

Figure 9:
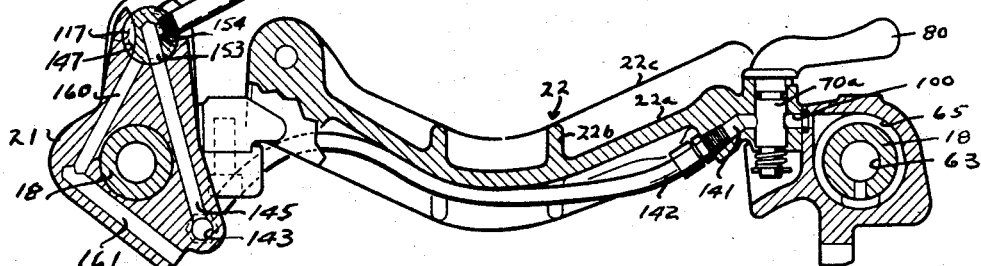
Fig. 9 is a section taken in the line 9—9 of Fig. 8.

In this instance, the connecting member 22 which extends between the carriage supporting members 20—21 is a wider frame and includes a web 22a which is apertured to reduce its weight and to allow free drainage of the cutting oil therethrough. It is strengthened by transverse and longitudinally extending ribs 22b and 22c respectively which extend above and below the web as best seen in Fig. 9.

Preferably the transverse member 22a is made separately from the carrier support members 22—21, the carriage support members being provided with slots for receiving the ends of the transverse member which is bolted thereto by bolts 22g.

The oil receiving chamber 65 connects with a duct 100 under control of a manually operated valve 70a which carries an operating handle 80. The valve controls the flow of liquid to a duct 141, disposed in the web 22a, and which is connected by a pipe 142 to a duct 143 in the rear member 21. The rear member is provided with a boss 104 which is provided with an upwardly rising duct 145. The upwardly rising duct opens into a cylindrical seat 147 in the upper end of the boss 104.

Figure 11:
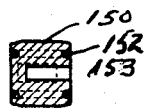
Fig. 11 is a section in the lines 11—11 of Fig. 10.
Figure 10:
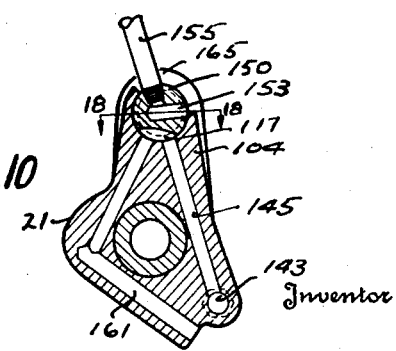
Fig. 10 is a fragmentary section similar to Fig. 9 showing the parts in a different position.

The seat opens through both sides of the boss and receives therein a valve and oil spout support member 150. It is generally of cylindrical formation and journalled for rotation in the seat. As best shown in Fig. 11, it is provided with a pair of circumferential grooves, near each end, which receive O rings 152 that provide a seal against the loss of oil beyond the ends. The duct 145 is adapted to communicate with a duct 153 in the valve body 150 and by way of a duct 154 to the oil spout member 155.

The upper end of the boss 104 is provided with a downwardly and arcuately extending slot 165 which intersects the seat and through which the tubular oil spout 155 extends. The oil spout tube is screwed into the valve body and is used to rotate the valve body, as well as position the spout, to control the supply of oil to the spout. The valve body is provided with a bypass 117, which, when the spout is moved to a near vertical position diverts the oil from the duct 145 to a downwardly extending duct 160 which communicates with a downward and forwardly extending duct 161 that discharges the oil into the oil pan.

The outer end of the oil spout is provided with a body 175 which is rotatably journalled on a reduced end 155a. The body being provided with a pin 156 which extends into a circumferentially extending slot in the oil spout tube. The body is provided with a pocket 157 which extends beyond the end of the oil spout tube and a port 158 opens through the body. A spring 130 is disposed in the pocket engaging one end of the pocket and the end of the tube and provides sufficient friction that the body may be adjusted to any position by means of the knurled handle 131 to cause the duct to face in any direction desired within the limits of the slot which is engaged by the pin 156.

It will thus be seen that the amount of liquid which is fed to the spout may be controlled by the valve 70a on the front of the carriage. The spout being disposed to the left of the carriage may be swung vertically within the limits of the slot 165 in the upper part of the boss. In these positions, being to the left of the cutter and threading die, the cutting oil may be flowed onto the die chasers, the cutter wheels and/or the work and is flowing toward the end of the pipe being operated and no great quantity of oil gets into the interior of the pipe as was apt to occur with the other device.

One of the principal advantages is the fact that it is very simple and quick to swing the spout up completely out of the way where it cannot be damaged and does not interfere with the changing of pipes or other operations where cutting oil is not needed. At this time the oil supply is automatically diverted back to its source.

The rotatable adjustment of the handle is such that the oil can be directed to any place in the dies or cutter or on the work to provide the supply at the exact position desired and that it may be quickly and easily adjusted since there are no flexible tubes involved. The amount of oil discharged can be controlled by the handle 80 on the front of the machine.

All of the foregoing increases the efficiency of the operator because of the ease and ability to make the adjustments quickly.

Having thus described our invention, we are aware that numerous and extensive departures may be made therefrom without departing from the spirit or scope of our invention.

We claim:

A pipe working machine including a pipe turning chuck, a bed extending beyond the chuck, a carriage movable on said bed and carrying pipe working tools thereon, said bed including a pair of spaced parallel tubular members and the carriage including a hollow support member slidably journalled on the tubular members and a duct in one of the tubular members for supplying oil thereto, said carriage support member having a duct therein for receiving oil and valve means for controlling the flow of oil through the duct, means for transmitting oil from the one carriage support member to the second support member, said second support member being formed with an upstanding boss and formed with an oil duct therein arranged to receive oil from said oil transmitting means, a cylindrical opening disposed in the upper end of the boss with its axis in parallel relation to said tubes, said duct communicating with said opening, cylindrical means rotatably journalled in said opening and having an oil duct formed therein, an oil spout carried by said cylindrical means and having an oil passage communicating with said duct, said boss being formed with an arcuate slot and said oil spout extending therethrough and arranged to move said cylindrical means by swinging the oil spout within the limits of said slot.

References Cited in the file of this patent

UNITED STATES PATENTS

| | | |
|---|---|---|
| 1,010,927 | Letcher | Dec. 5, 1911 |
| 1,152,398 | Corey | Sept. 7, 1915 |
| 1,458,042 | Fletcher | June 5, 1923 |
| 1,669,504 | Baker | May 15, 1928 |
| 1,943,643 | Vosper | Jan. 16, 1934 |
| 2,249,395 | Reese | July 15, 1941 |
| 2,643,640 | Lear | June 30, 1953 |